(No Model.)

G. F. POTTLE.
CORNER AND HINGE PIECE FOR TRUNKS.

No. 522,182. Patented June 26, 1894.

WITNESSES
Frank G. Parker,
Edward S. Day

INVENTOR
George F. Pottle

THE NATIONAL LITHOGRAPHING COMPANY,
WASHINGTON, D. C.

UNITED STATES PATENT OFFICE.

GEORGE F. POTTLE, OF MEDFORD, MASSACHUSETTS.

CORNER AND HINGE PIECE FOR TRUNKS.

SPECIFICATION forming part of Letters Patent No. 522,182, dated June 26, 1894.

Application filed March 13, 1894. Serial No. 503,476. (No model.)

*To all whom it may concern:*

Be it known that I, GEORGE F. POTTLE, of Medford, in the county of Middlesex and State of Massachusetts, have invented a new and useful Improvement in Corner and Hinge Pieces for Trunks, of which the following, taken in connection with the accompanying drawings, is a specification.

My invention relates to a device to be applied to a trunk and consists in a casing formed of metal and adapted to give additional strength to the trunk, especially to such parts as are relied upon to secure a firm connection between the body of the trunk and its cover. Also to prevent the cover from getting out of working adjustment with the body, and especially and particularly, to secure a firm and exact housing for protecting the hinges, and for fixing and holding the pivots upon which the members that constitute the moving parts of the hinges, turn. The object being to improve the trunk and to facilitate its construction. This object I attain by means of the mechanism shown in the accompanying drawings, in which—

Figure 1:
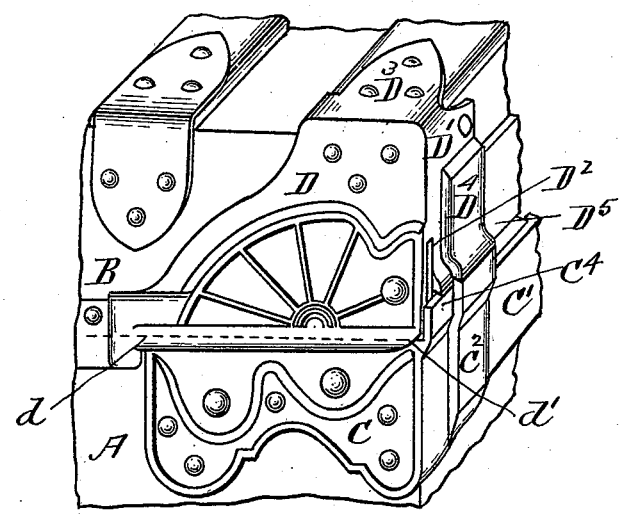
Figure 2:
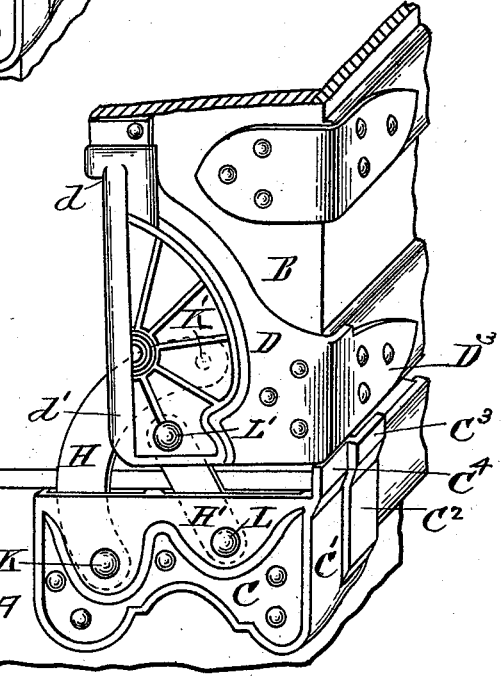
Figure 3:
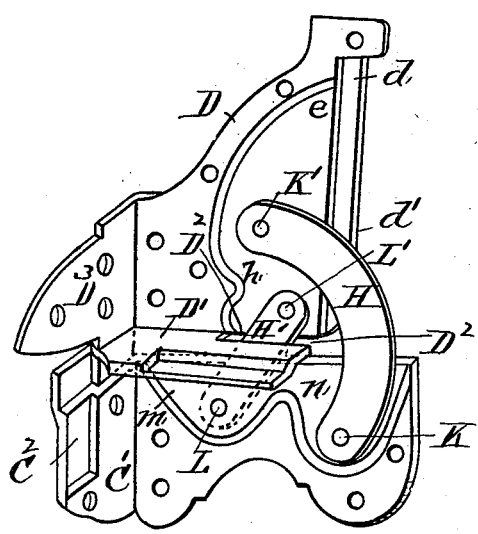

Figure 1 is a view in perspective showing the corner of a trunk having my corner and hinge reinforcement pieces. Fig. 2 is a perspective view showing the same parts that are shown in Fig. 1, but the cover of the trunk is shown as turned up to the full open position. Fig. 3 is a view in perspective showing my reinforcing pieces and the hinges from the interior, the wood-work, &c., being omitted so that the interior feature of my device may be fully shown.

If we suppose A and B to represent respectively a corner of the body of the trunk and the cover, then the position or location of my device in relation to the trunk may be understood, that is, the parts are placed so as to embrace the rear corners of the trunk at the juncture of the cover with the body and that they embrace and include the hinges.

The corner piece that is attached to the body of the trunk is represented by C C' $C^2$ $C^3$ $C^4$ and the part that is attached to the cover is represented by D D' $D^2$ $D^3$ $D^4$ $D^5$.

The parts to be attached to the body of the trunk have a part C fastened firmly to the end, which is provided with a recess $m\ n$ see Fig. 3, which is made as a receptacle for the lower parts of the hinge strips H and H'. The lower ends of the hinge strips H and H' are pivoted to the reinforcing plate C at L and K. The part C' of the reinforcing plate extends onto the rear of the body of the trunk, and is provided with a lip $C^4$ that extends above the line of the joining of the cover and body of the trunk, and serves in conjunction with a corresponding member $D^5$ to form a strong buttress device for strengthening the trunk. $C^2$ $C^3$ is also a strengthening member adapted to co-act in connecting with the member D.

It is to be observed that all of the members C C' $C^2$ $C^3$ $C^4$ constitute a single reinforcing and hinge-piece for the body of the trunk.

The reinforcing and hinge-piece for the cover of the trunk, is in a general way formed of three members integrally connected; of these parts D is on the end, D' $D^4$ on the rear, and $D^3$ on the top of the cover; the part D is recessed as shown at $h\ e$, Fig. 3 for the reception of the upper ends of the hinge strips H and H' which are hinged to it by the pivots at K' and L'.

$d\ d'$ is a lip formed on the part D and serves in connection with the upper edge of the part C to form a buttress device for strengthening the trunk as a whole.

A kerf $D^2$ is formed in the part D' as shown to allow the movement of the hinge strip H' when the trunk is opened.

I claim—

In a trunk reinforcing and hinge-pieces, the combination of a part adapted to form a corner piece for the cover of the trunk, and having a recess as described for the hinge strips and their pivots; with a corner piece for the body of the trunk having a recess for receiving the hinge strips and their pivots, and hinge strips connecting pivotally the said corner pieces substantially as described and for the purpose set forth.

In testimony whereof I have signed my name to this specification, in the presence of two subscribing witnesses, on this 8th day of March, A. D. 1894.

GEORGE F. POTTLE.

Witnesses:
 WILLIAM EDSON,
 F. E. DURGIN.